US006141643A

United States Patent [19]

Harmon

[11] Patent Number: 6,141,643

[45] Date of Patent: Oct. 31, 2000

[54] DATA INPUT GLOVE HAVING CONDUCTIVE FINGER PADS AND THUMB PAD, AND USES THEREFOR

[76] Inventor: Steve Harmon, P.O. Box 535, Collinsville, Va. 24078

[21] Appl. No.: 09/199,680

[22] Filed: Nov. 25, 1998

[51] Int. Cl.[7] .............................. G06F 17/20; G10L 21/00

[52] U.S. Cl. .............................. 704/271; 704/272; 704/1; 235/462.44; 340/407.1; 341/21; 345/156; 463/37

[58] Field of Search .............................. 704/1, 2, 3, 10, 704/270, 271, 272, 275; 340/407.1, 407.2; 345/156, 162, 189, 326; 463/36, 37; 341/20, 21, 22; 235/462.44, 462.45

[56] References Cited

U.S. PATENT DOCUMENTS

| | | | |
|---|---|---|---|
| 4,414,984 | 11/1983 | Zarudiansky | 600/587 |
| 4,613,139 | 9/1986 | Robinson, II | 463/37 |
| 5,047,952 | 9/1991 | Kramer et al. | 704/271 |
| 5,143,505 | 9/1992 | Burdea et al. | 414/5 |
| 5,166,463 | 11/1992 | Weber | 84/600 |
| 5,184,009 | 2/1993 | Wright et al. | 250/227.11 |
| 5,184,319 | 2/1993 | Kramer | 395/500.26 |
| 5,212,372 | 5/1993 | Quick et al. | 235/462.44 |
| 5,451,924 | 9/1995 | Massimino et al. | 340/407.1 |
| 5,481,454 | 1/1996 | Inoue et al. | 704/3 |
| 5,488,362 | 1/1996 | Ullman et al. | 341/20 |
| 5,512,919 | 4/1996 | Araki et al. | 345/156 |
| 5,514,861 | 5/1996 | Swartz et al. | 235/462.44 |
| 5,632,679 | 5/1997 | Tremmel | 463/36 |
| 5,764,164 | 6/1998 | Cartabiano et al. | 341/22 |
| 5,796,354 | 8/1998 | Cartabiano et al. | 341/22 |
| 5,875,257 | 2/1999 | Marrin et al. | 382/107 |
| 5,887,069 | 3/1999 | Sakou et al. | 382/100 |
| 6,030,290 | 2/2000 | Powell | 463/36 |

OTHER PUBLICATIONS http://ils.unc.edu/alternative/dataglove.html, dated Apr. 5, 1999.

http://www.streettech.com/bcp/BCPgraf/StreetTech/VPL.html, dated Apr. 5, 1999.

http://www.cs.monash.edu.au/~dcron/glove/glove.tech.data.html, dated Apr. 5, 1999.

http://www.cs.monash.edu.au/~dcron/glove/glove.app.nat.nasa.html, dated Apr. 5, 1999.

*Primary Examiner*—Joseph Thomas

*Attorney, Agent, or Firm*—William A. Barrett; Steven J. Hultquist

[57] ABSTRACT

A data input glove including a gloved body at least some of whose fingertip portions have conductive fingertip pad elements thereon, operatively connected to an output connector, and at least one conductive palm pad positioned on a palm portion of the gloved body and operatively connected to an output connector, wherein contact between a finger pad and a palm pad generates a signal. The signal may be processed by computer processor to provide a desired output, e.g., synthesized speech or other analogue or digital output in a suitable medium. The data glove is useful for inputting data in a covert manner, as well as communicationally enabling disabled persons with the aid of a computer, such as a handheld, wearable, or desktop computer.

27 Claims, 3 Drawing Sheets

DATA INPUT GLOVE HAVING CONDUCTIVE FINGER PADS AND THUMB PAD, AND USES THEREFOR

1. FIELD OF THE INVENTION

The invention relates to a data input glove, and to a method of inputting data into a computer processor using such data input glove.

2. BACKGROUND OF THE INVENTION

There is a need in the art of computer input devices for an input device which can transmit data from an operator to a computer processor without the need for a bulky keyboard or unwieldy hand-held input device. Conventional hand-held computing devices require the operator to hold the device in one hand and operate the keyboard with the other. Such two-handed operation does not allow the user to concurrently perform other manual tasks. There is therefore a need in the art for an input device which enables an operator to transmit data to a computer processor without requiring manual retention and manipulation of an input device in the operator's hand.

The present invention provides a data input glove that fulfills the foregoing needs by enabling a user to transmit data to a computer processor by contacting the fingers and/or thumb of the glove with various parts of the glove.

There is also a need in the art for a means for enabling a deaf person to communicate with other individuals without using sign language.

The present invention provides a communication system which fulfills this need by employing the data input glove as an input device, a computer processor to translate input from the data input glove into letters, numbers or symbols, and an output device, such as a visual display unit or speakers to communicate the resulting data to another individual.

3. SUMMARY OF THE INVENTION

Briefly described, the invention comprises a glove for inputting electronic signals into a computer. The glove, may in one embodiment, comprise a series of negatively-charged and positively-charged conductive pads, arranged to generate a binary signal when any one of the negatively charged pads is operatively contacted by the operator with any one of the positively charged pads.

One object of the present invention is to provide a data input device, such as a glove, whereby an operator can input code into a computer by applying pressure to various pressure points located on the glove itself.

The present invention in another aspect comprises a communication system for permitting a deaf person to communicate with others without using sign language. The system generally comprises a data input glove which is operationally coupled to a computer processor programmed to provide output to a display, terminal, e.g. a video display audio speakers or other output means which can be perceived, e.g., observed or heard, by the person to whom the deaf person is communicating. Such a communication system may also optionally comprise a system to permit others to communicate with the deaf person, such as a microphone coupled to the computer processor which is programmed to interpret audio input received by the microphone. The communication system may also comprise a sound-activated vibrating mechanism which alerts the wearer that there is a sound, such as a voice of someone speaking, in the wearer's vicinity.

4. BRIEF DESCRIPTION OF THE DRAWINGS

5. DETAILED DESCRIPTION OF THE INVENTION

Figure 1:
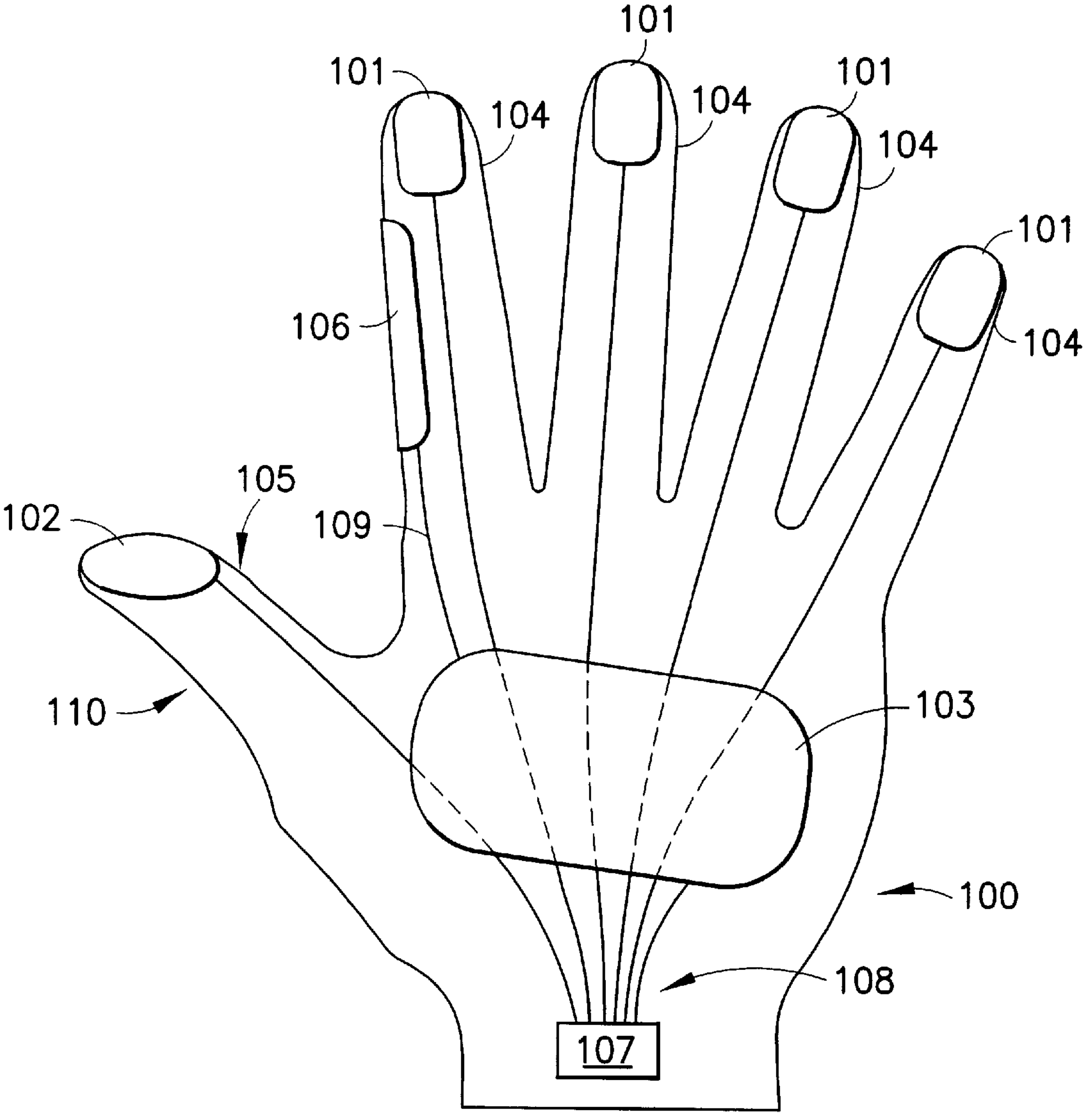
FIG. 1 shows an anterior surface of a preferred embodiment of a data input glove according to the present invention.

FIG. 1 depicts in simplified form, the electrical components of a data input glove according to one embodiment of the invention, generally including a glove 100 (shown facing palm up), a series of signal pads 101, 102, 103 and 106, a connector 107, and wires 108 connecting the connector to the signal pads.

The glove can be constructed from conventional glove-making materials of any type, such as for example cloth, leather or plastic laminate. The glove preferably is made of a durable light weight material having layers into which the connectors can be placed. The glove is preferably arranged to be light and comfortable for the benefit of the operator. It will be appreciated, however that the construction of the glove may be widely varied depending on the environment in which it is used. In a cold climate, heavier materials of construction may be used to warm the hands of the operator during operation of the glove. The glove may be also disguised to appear as an ordinary glove to facilitate covert collection of data or covert communications.

The glove includes a series of signal-generating pads 101, 102, 103, and 106, variously referred to herein as signal pads, fingertip pads, palm pads, etc. The word "pad" is used herein is intended to be broadly construed to encompass any suitable element that may be usefully employed to generate a signal, or cause a signal to be generated, upon contact with another surface or with another pad, or which can otherwise generate a signal or cause a signal to be generated when pressure is applied to the pad. A preferred pad material of construction is silver-impregnated nylon, such as is produced by SPC Technology. In a preferred embodiment, the pads are made from a conductive material, and generate a signal when a first pad connected to a positive wire, contacts a second pad connected with a negative wire, to form a closed circuit.

The ensuing description illustratively describes such a preferred embodiment, i.e., wherein negatively-charged conductive pads and positively-charged conductive pads are provided in a single glove, and operatively arranged such that when a positive pad contacts a negatively-charged pad, a closed circuit is formed, thereby generating a signal. However, it will be appreciated by those of ordinary skill in the art that many functional and/or structural alternatives to this basic configuration are possible within the scope of the present invention. For example, in one alternative embodiment, the signal pads can contain positive and negative components in each signal pad, which contact each other when pressure is applied to the pad. In general, the present invention encompasses any operative configuration wherein a signal can be generated by contacting one part of a glove to another part of the same glove. The word "signal"

as used herein is intended to be broadly constructed to encompass an initiation of, a cessation of, or a fluctuation in a form of energy, such as electricity or light.

Figure 2:
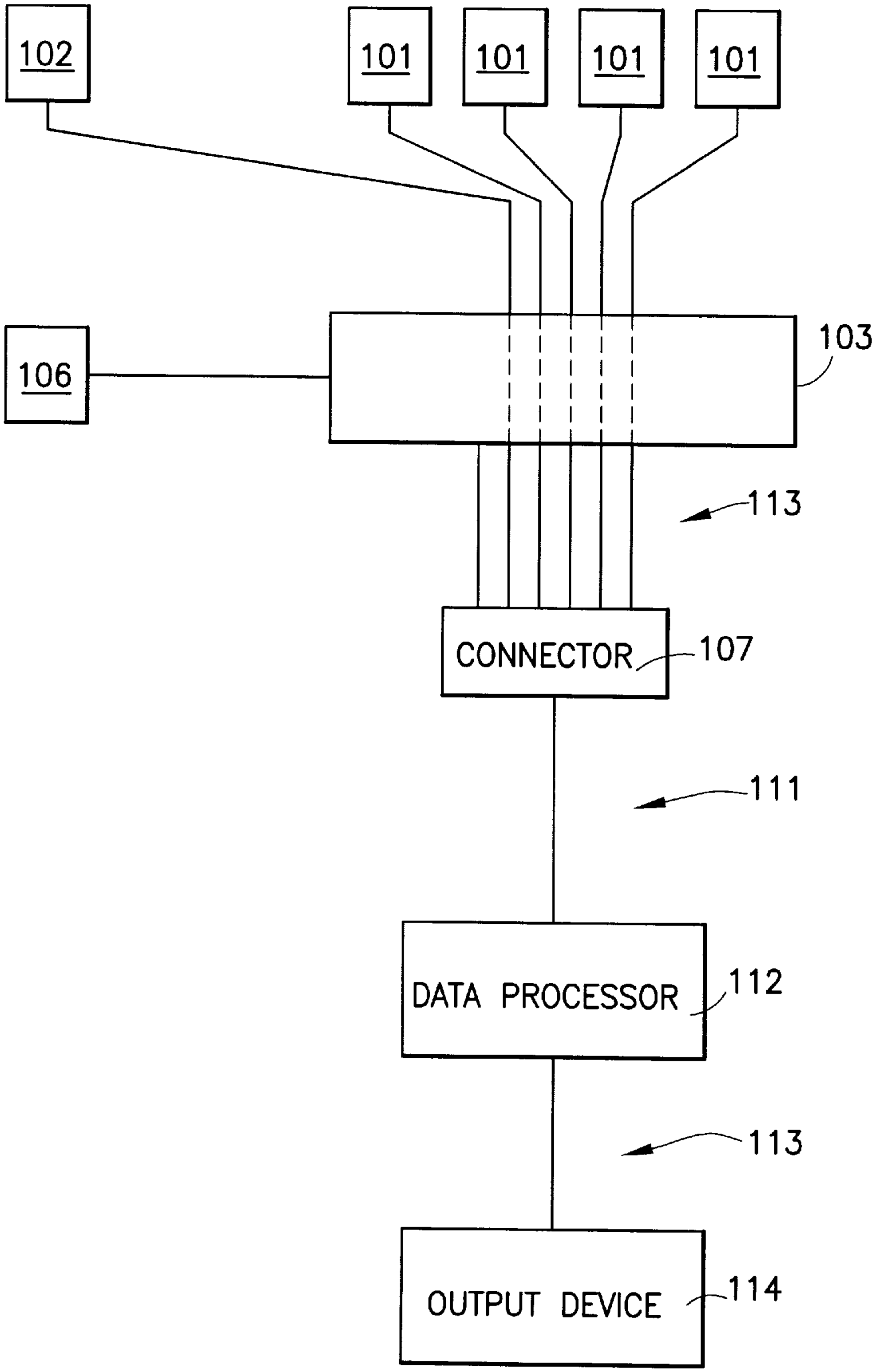
FIG. 2 is a schematic showing the interconnection of the data input glove with the computer processor and the output means.

As illustrated in FIGS. 1 and 2, the glove has one or more fingertip signal pads 101. The glove preferably has 1, 2, 3 or 4 fingertip signal pads, and most preferably the glove has 4 fingertip signal pads, one for each finger 104. The fingertip pads 101 may generally be located in any position that enables the user to bring the finger tip pads 101 into contact with one or more palm pads 103, and/or a thumb pad, when present. In a preferred embodiment, the fingertip pads are located generally on the anterior surface of the distal portion of the fingers 104 and may extend over the distal portion of the fingers 104 of the glove 100. It will be appreciated that depending on the complexity of the desired input the fingertip pads 101 may be present on one or all of fingers 104 of the glove 100.

The glove preferably also has one or more palm signal pads 103. In general, the one or more palm signal pad(s) 103 are located in any position in which the user can bring the fingertip pads 101 into contact with the palm pad(s) 103. For example, a single palm pad 103 may be located substantially in the palm area of the glove. In a preferred embodiment a single palm pad 103 is used, and is approximately 2.5 to 3 inches across (though the size of the palm pad depends on the size of the glove) and extends generally parallel to the base of the palm, substantially across the lower half of the palm. The palm pad may also cover all or part of the anterior surface 105 of the thumb 110.

The circuitry associated with the glove preferably is configured such that when one or more of the finger tip pads contacts one or more of the palm pads, a closed circuit is formed, causing the production of a binary signal. For example, either the finger pads may be negatively-charged and the palm pads positively-charged, or the finger pads may be positively charged and the palm pads negatively-charged. A signal may include an initiation, cessation, and/or fluctuation of energy.

The glove optionally has one or more lateral index finger pads 102. For example, a single lateral index finger signal pad 106 may be positioned on the lateral side of the index finger of the glove, as illustrated, in any position that enables the user to contact a thumb pad 102 with the lateral index finger pad 106. In a preferred embodiment, the lateral index finger signal pad 106 is connected by a wire to the palm pad 103, and both pads have the same charge.

The glove optionally may have a thumb pad 102 positioned generally on the ventral surface of the distal portion of the thumb. Depending on the configuration of the glove (described in more detail below), the thumb pad 102 may be positioned such that the thumb pad can conveniently be made to contact the index finger pad 106 and/or the fingertip pads 101.

In one embodiment, the finger-tip pads 101 and the thumb pad 102 all have the same charge and the lateral index finger pad 106 and the palm pad 103 both have an opposite charge. The finger-tip pads 101 and the thumb pad 102 preferably are set as a logical low or ground, and the lateral index finger pad 106 and the palm pad 103 preferably are set as a logical high, or vice versa. Accordingly, a wide variety of binary signals can be generated as the finger-tip pad 101 and thumb pads 102 contact the palm pad 103 and lateral index finger pad(s) 106. The data input glove sends a binary data package, representing the current state of all closed circuits, to the computer processor via the output means whenever one or more of the positive pads comes into contact with one of the negative pads, or when one of the logical high pads comes into contact with one of the logical low pads. For example, the following binary messages can be generated:

| Thumb | Finger 1 | Finger 2 | Finger 3 | Finger 4 |
|---|---|---|---|---|
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 0 | 0 | 0 | 0 | 1 |
| 1 | 1 | 0 | 0 | 0 |
| 1 | 0 | 1 | 0 | 0 |
| 1 | 0 | 0 | 1 | 0 |
| 1 | 0 | 0 | 0 | 1 |
| 0 | 1 | 1 | 0 | 0 |
| 0 | 1 | 0 | 1 | 0 |
| 0 | 1 | 0 | 0 | 1 |
| 0 | 0 | 1 | 1 | 0 |
| 0 | 0 | 1 | 0 | 1 |
| 0 | 0 | 0 | 1 | 1 |
| 1 | 1 | 1 | 0 | 0 |
| 1 | 1 | 0 | 1 | 0 |
| 1 | 1 | 0 | 0 | 1 |
| 1 | 0 | 1 | 1 | 0 |
| 1 | 0 | 1 | 0 | 1 |
| 1 | 0 | 0 | 1 | 1 |
| 1 | 0 | 0 | 1 | 1 |
| 0 | 1 | 1 | 1 | 0 |
| 0 | 1 | 1 | 0 | 1 |
| 0 | 1 | 0 | 1 | 1 |
| 0 | 0 | 1 | 1 | 1 |
| 1 | 1 | 1 | 0 | 1 |
| 1 | 1 | 0 | 1 | 1 |
| 1 | 0 | 1 | 1 | 1 |
| 0 | 1 | 1 | 1 | 1 |

The binary signal can be transmitted to the computer processor by a wide variety of transmission means, including a modem, or an infrared signaling means, direct wiring to the computer processor via parallel, serial, or universal serial bus (USB), UHF/satellite wireless Internet connection, and/or wireless LAN connections. In a preferred mode, the glove is connected to a parallel port which also serves as a power connection for the glove.

As a further alternative, the glove may be hardwired to a signaling device that may be located elsewhere on the operator, such as in a pocket or on a hat worn by the operator.

Additionally, the glove may be hardwired to a computer processor which is located on the glove itself or elsewhere on the operator.

Figure 3:
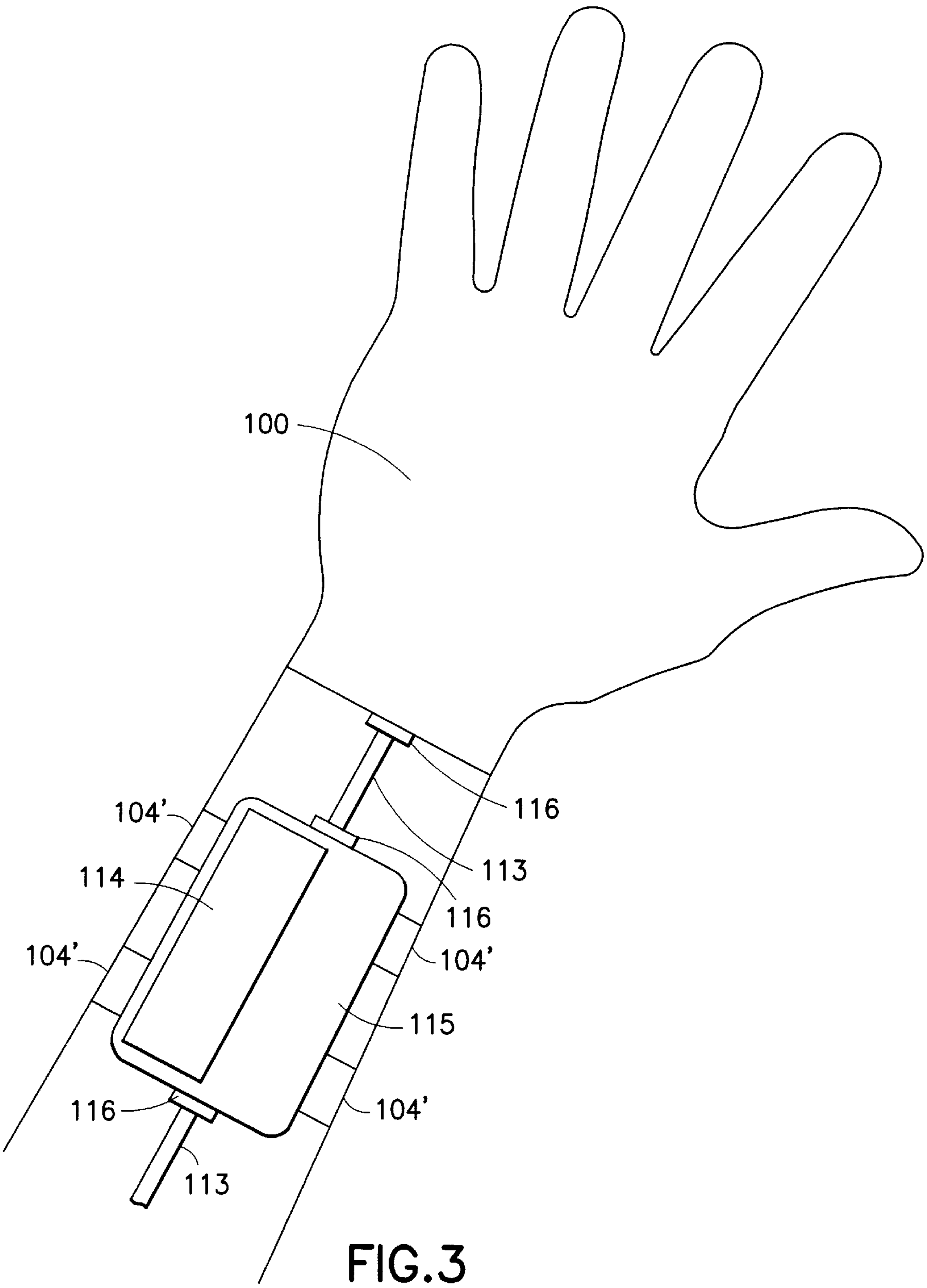
FIG. 3 shows a communication system according to one embodiment of the present invention, including a display unit and vibrator that are contained in an electronics casing strapped to a user's wrist and a processing unit that is located remotely from the electronics casing.

A data display device may also be mounted on the glove or elsewhere on the operator. As shown in FIG. 3, the data display device can be strapped to the operator's wrist. Where a terminal is present, it may be operationally connected to the computer processor by means known in the art. Alternatively, the display device may be located remotely from the operator.

It will be appreciated by those of skill in the art that a wide variety of connecting means may be used to connect the signal pads 101, 102, 103 and 106, and the connector 107. In a preferred mode, the connections are provided by standard signal wires that may be contained within the cloth of the glove.

The system optionally includes a microprocessor-based data processor, comprising a central processor unit (computer processor), a random access memory (RAM) for storing data, and optionally comprising a read-only memory (ROM) or other disk drive for storing fixed programming data, etc. The data processor and hard disk drive may consist of elements similar to those found in a 16-bit or 32-bit handheld or laptop-type personal computer.

Cable connections can be provided for the various signal communications between the data processor unit and the data input components.

The glove may further comprise an integrated power supply, e.g., a battery system to provide power to the aforementioned components. The battery base power supply may be located on the glove itself or elsewhere on the user. Preferably the glove is coupled to a parallel port of a computer.

Preferably, the wire conductors are contained within the fabric of the glove. However, this is not required, as the wires can be adhered to the outer and/or interior surface(s) of the glove. The glove and the wires can be arranged so that the wires are bundled together, or are spread out over a large surface portion of the glove.

Batteries, where used, can be located on the body of the user and connected to the glove through flexible cables (not shown). Preferably, such external batteries are rechargeable, and may be placed in a container carried in the operator's pocket or on the operator's belt.

An external connector to the "COM" port (not shown) may take the form of a cable connection to a host computer system for transferring data from the data input glove to the computer processor.

The computer processor 112 can be located on the glove. For example, where the data processor 112 is located on the glove, it can be attached substantially as described in U.S. Pat. No. 5,514,861 (the disclosure of which is hereby incorporated herein by reference in its entirety). The processor may also be located elsewhere on the operator or remotely from the operator. When the processor is located remotely from the operator, a signaling means, such as a wireless modem or an infrared signaling device, preferably is included, either on the glove itself or elsewhere on the operator.

The limited number of input locations on the glove can be used to input a wide variety of codes for alphanumeric or other symbols. The computer processor is programmable by specific operations so that codes can be tailored to the individual operating the input glove.

The glove can further comprise various function pads or switches, which may be activated by pressing the glove against an external surface such as another body part. The computer processor can be programmed in a variety of ways to interpret differently the standard pad combinations. For example, commonly used words or phrases may be attached to each code combination such that upon pressing the function pad, the operator need only enter a single symbol to signify a commonly used word or phrase.

The glove may also be configured with control switches, which operate to change its mode of operation. For example, a control switch may be positioned as to be easily operated by the thumb. In such circumstance, the glove can still be conveniently operated with only one hand. Alternatively, a control switch may be located on the back of the glove such that it can conveniently be manipulated with the other hand or by pressing the glove against an external object. The control switch can be a pressure sensitive switch located in the glove.

The system can also include a wireless transceiver (e.g. infrared or radio frequency), to permit the glove to transmit data to an external computer system while the operator is wearing the glove. In a preferred embodiment using wireless transmission, the wireless transceiver is a spread spectrum type and is contained in a housing mounted on the glove or elsewhere on the operator. The transceiver module can include shielding to prevent interference and can be in radiation hardened if necessary or desirable in a given end use application. This embodiment of the system can also include a flexible RF antenna connected to the transceiver. The antenna can be sewn on or woven into the fabric of the back portion of the glove, or positioned elsewhere on the operator.

In a preferred embodiment, the data input glove is hardwired to a computer processor which is programmed to translate the input signals into speech which is displayed visually or is broadcast audibly. Such a system may be employed by deaf persons to transform hand signals into speech. For example, the operator can wear a display screen positioned on a garment so that others may read the messages displayed thereon. Alternatively, the data input glove may transmit signals to a computer processor which is programmed to transform the input signals received from the data input glove into speech which is emitted from an audio speaker located on the operator.

An illustrative communication system is shown in FIG. 3 which shows a data input glove 100 with the back of the glove facing up, coupled to a computer processor (not shown) which in turn is connected by a cable 113 to a standard liquid crystal display (LCD) unit 114, such as a unit conventionally used in palm-based computers. The LCD unit is contained within an electronics casing 115 which is attached to the operator's wrist by straps 104. The system also comprises a sound-activated vibrator (not shown) contained within the electronics casing 115. The means used to connect the wiring to the glove and the casing may be standard RJ45 connectors 116.

The computer can, for example, be a laptop carried by the operator in a backpack or elsewhere. Alternatively, the system is a hand-held or palm-based computer which may be placed in a pocket or elsewhere on the user.

Although a number of arrangements of the invention have been described by way of example, it is not intended that the invention be limited thereto. Accordingly, the invention should be considered to include any and all configurations, modifications, variations, combinations, or equivalent arrangements falling within the scope of the annexed claims since a variety of additional modifications will be readily apparent to those skilled in this art based on the disclosure herein.

EXAMPLE

A glove was constructed from a golf glove made of Cabratex 101, a synthetic leather. The power source (3 Volts) and ground were supplied from the computer's parallel port. The connecting wires were 28-gauge stranded wire, of the type used in standard printer cables. Strips of the glove material were sewn/glued over the wires in the interior of the glove. The conductive pads were made from a silver-impregnated nylon material, commercially available from SPC Technology. The pads were sewn/glued onto the glove. A Pentium 233 MHz processor-based computer was utilized, although any computer with a parallel port and at least 166 MHz processor architecture would work. The data-to-voice software and the voice-recognition software for use with the glove are readily commercially available from several vendors. The glove of this example used Lernout & Hauspie Voice Xpress Plus software.

The palm pad and lateral index finger pad were configured as a ground and the fingertip pads and thumb pad were connected to a 3V source of current at the parallel port, such that contacting a fingertip pad or thumb pad to the palm pad or lateral index finger pad resulted in a closed circuit and sent a binary signal to the parallel port.

In this configuration, the fingertips represented a dataline logical of the parallel port. They were set too high, and when they contacted the palm pad, the current was brought low. The computer processor read this fluctuation and then brought the dataline back high.

The computer was programmed to translate the glove's input to alphanumeric characters and further into words.

We claim:

1. A data input glove comprising:

(a) a glove comprising fingers and a palm;

(b) one or more conductive finger tip pads positioned generally on one or more finger tips of the glove and operatively connected to an output connector;

(c) one or more conductive palm pads positioned generally on the palm of the glove and operatively connected to an output connector;

wherein the foregoing elements of (a), (b) and (c) are configured such that contacting any of the finger pad(s) with any of the palm pad(s) forms a closed circuit, thereby generating a binary signal.

2. The data input glove of claim 1 further comprising:

(a) one or more conductive thumb tip pads positioned generally on the thumb tips of the glove and operatively connected to an output connector; and (b) one or more conductive lateral index finger pads positioned generally on the lateral side of the index finger and operatively connected to an output connector;

configured such that contacting the thumb tip pad(s) pad to the lateral index finger pad(s) forms a closed circuit, thereby generating a binary signal.

3. The data input glove of claim 2 wherein the fingertip pads and thumb tip pad are connected to a source of current and the palm pad and lateral index finger pad are each a ground.

4. The data input glove of claim 3 further comprising a display unit operatively connected to the computer processor.

5. The data input glove of claim 3 further comprising an audio speaker unit operatively connected to the computer processor.

6. The data input glove of claim 3 wherein the computer processor is programmably arranged to translate binary signals from the data input glove into speech output.

7. The data input glove of claim 3, further comprising a microphone operatively coupled to the computer processor, wherein the computer processor is programmed to translate input speech from the microphone into symbols for display on the display unit.

8. The data input glove of claim 1 wherein the fingertip pads are set at logical high.

9. The data input glove of claim 1 wherein the palm pad is set at logical low or is a ground.

10. The data input glove of claim 1 wherein the fingertip pads are connected to a source of current and the palm pad is a ground.

11. The data input glove of claim 1 further comprises an infrared signal-transmitting device for transmitting input from the data input glove to a computer processor.

12. The data input glove of claim 1 further comprising a computer processor operatively connected to the output connector.

13. A data input glove comprising:

(a) a glove comprising fingers and a palm;

(b) one or more conductive finger tip pads positioned generally on the finger tips of the glove and operatively connected to an output connector; and, (c) one or more conductive palm pads positioned generally on the palm of the glove and operatively connected to an output connector;

wherein the foregoing elements are configured such that contacting any of the finger pads with any of the palm pads forms a closed circuit, thereby generating an electrical signal; and (d) a conductive thumb tip pad; and (e) a conductive lateral index finger pad;

configured such that contacting the thumb pad to the lateral index finger pad forms a closed circuit, thereby generating an electrical signal.

14. The data input glove of claim 13 wherein the fingertip pads and thumb tip pad are connected to a source of current and the palm pad and lateral index finger pad are each a ground.

15. The data input glove according to claim 13 wherein the fingertip and thumb pads are set at logical high.

16. The data input glove according to claim 13 wherein the palm pad and lateral index finger pad are set at logical low or are a ground.

17. A communication system comprising:

(a) a data input glove comprising:

(i) a glove comprising fingers and a palm;

(ii) one or more conductive finger tip pads positioned generally on one or more finger tips of the glove and operatively connected to an output connector; and (iii) one or more conductive palm pads positioned generally on the palm of the glove and operatively connected to an output connector;

wherein the foregoing elements, (i), (ii) and (iii) are configured such that contacting any of the finger pad(s) with any of the palm pad(s) forms a closed circuit, thereby generating a binary signal;

(b) a computer processor operationally connected to the data input glove and programmably arranged to translate input from the data input glove to an output for output by an output means;

(c) an output means operationally connected to the computer processor.

18. The system of claim 17 wherein the data input glove further comprises:

(a) one or more a thumb tip pads positioned generally on the thumb tips of the glove and operatively connected to an output connector; and (b) one or more lateral index finger pads positioned generally on lateral side of the index finger and operatively connected to an output connector; and configured such that contacting the thumb pad(s) to the lateral index finger pad(s) forms a closed circuit, thereby generating a binary signal.

19. The system of claim 18 wherein the fingertip pads and thumb tip pad of the data input glove are connected to a source of current and the palm pad and lateral index finger pad are each a ground.

20. The system of claim 17 wherein the output means is a speaker operationally coupled to the computer processor.

21. The system of claim 17 wherein the output means is a visual display unit operationally connected to the computer processor.

22. The system of claim 17 wherein the computer processor is programmed to translate binary signals from the data input glove into speech output.

23. The system of claim 17 further comprising a microphone operatively coupled to the computer processor, wherein the computer processor is programmed to translate input speech from the microphone into symbols for display on the display unit.

24. The system of claim 17 further comprising an infrared signal-transmitting device for transmitting input from the data input glove to a computer processor.

25. The system of claim 17 wherein the fingertip pads are set at logical high.

26. The system of claim 17 wherein the palm pad(s) are set at logical low or are a ground.

27. The system of claim 17 wherein the fingertip pads are connected to a source of current and the palm pad is a ground.

* * * * *